Patented Apr. 24, 1928.

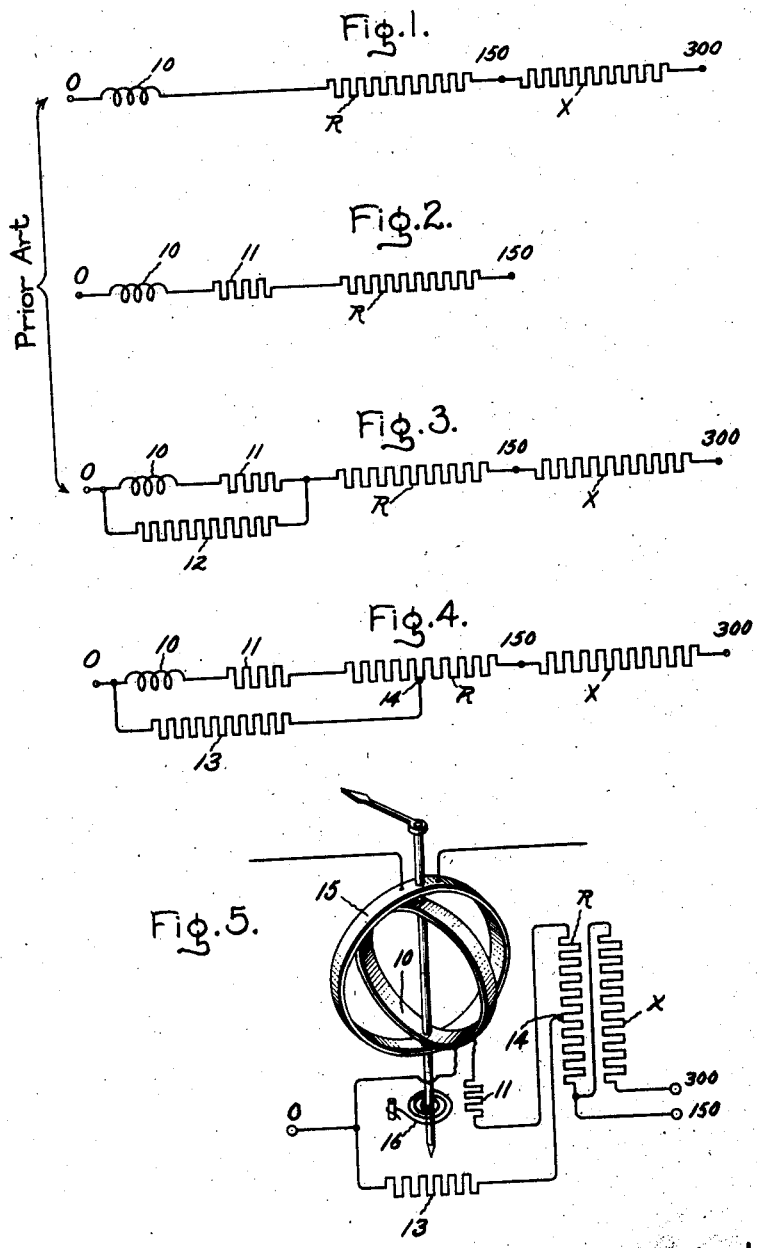

1,667,624

UNITED STATES PATENT OFFICE.

ALMON J. CORSON AND STEPHEN C. HOARE, OF LYNN, MASSACHUSETTS, ASSIGNORS TO GENERAL ELECTRIC COMPANY, A CORPORATION OF NEW YORK.

ELECTRICAL MEASURING INSTRUMENT.

Application filed October 17, 1924. Serial No. 744,268.

Our invention relates to electrical measuring instruments, and in particular to an improved temperature compensating arrangement therefor.

In electrical measuring instruments of the type in which the torque of a moving coil system is opposed by a control spring a temperature error may exist due to the heating of the control spring. It has heretofore been proposed to provide a small resistance element in series with the moving coil, which resistance is subjected to the same temperature as the control spring in order to compensate for the control spring temperature error. If the instrument is to be used for two ranges of measurements for example, a double voltage range and the armature circuit is provided with different voltage taps for that purpose, the above mentioned compensation will only be correct for one tap. To make the compensation universal, it has heretofore been proposed to shunt the armature and the control spring compensating resistance with a relatively high resistance. Unfortunately, this universal temperature compensating connection introduces new errors when used with alternating current instruments. These new errors are phase angle and frequency errors which are particularly noticeable with wattmeters when used on low power factors.

It is the object of our invention to provide a universal temperature compensating arrangement which will be substantially free from frequency and phase angle errors and consequently may be used with alternating current, double range instruments, particularly wattmeters.

We have discovered that the frequency and phase angle errors of the known universal compensating arrangement are due to the fact that there exists considerable difference in the time constants of the two parallel branches of this circuit and our invention consists in making the time constants of the parallel branches more nearly equal and less pronounced without destroying the universal temperature compensating feature.

The features of our invention which we believe to be novel and patentable will be pointed out in the claims appended hereto. For a better understanding of our invention, reference is made in the following description to the accompanying drawing, Figs. 1, 2 and 3 of which represent steps in the development of the prior art; Fig. 4 represents our improved compensating circuit; and Fig. 5 represents its application to a wattmeter of the electrodynamic type.

Referring now to the drawing, in which like reference characters are used to designate similar parts throughout, in Fig. 1 we have represented the armature or potential circuit of the usual type of double range electrodynamic instrument without compensation of any kind. In this circuit 0, 150 and 300 represent the three terminals of the circuit, 0 being a common terminal and 150 and 300 being alternate terminals used for, say, 150 and 300 volt ranges respectively. The armature is represented at 10. R represents the usual non-inductive resistance in series with the armature and X represents the non-inductive resistance for obtaining the double range which resistance is usually made equal to the resistance of the armature circuit between points 0 and 150, to simplify the scale indications for the two ranges.

The effect of temperature upon such an instrument is to decrease the elasticity of the control spring, generally making the instrument indicate high with increase in temperature. An increase in temperature also increases the resistance of the armature coil, tending to make the instrument indicate low. However, due to the relatively small effect of the increase in armature resistance and the remoteness of the control spring from the armature, the small compensation due to the armature coil itself is too small to be noticed.

In the single range instrument represented in Fig. 2, the control spring temperature error may be fully compensated for by a small spool of copper wire placed near the control spring, the compensating spool being connected in series with the armature and having such a resistance value and temperature coefficient that the effect of heat upon the spring is compensated for by the simultaneous change in the resistance of the copper spool, thus changing the current in the armature coil. In Fig. 2, this additional compensating resistance is represented at 11. Almost perfect compensation may be obtained with this scheme, but only for one voltage range.

The scheme is not universal for a double range instrument because of the different percentages of the copper spool in terms of the whole circuit when different taps are employed. It is of course possible to insert additional copper spools for each voltage tap considered and thus obtain correct compensation for all taps, but such a scheme is not desirable because it involves an additional change in connections which is not only bothersome, but which is very apt to be overlooked.

To overcome this difficulty with multiple range instruments, it has been proposed to use the scheme illustrated in Fig. 3 where a high resistance 12 is shunted around the armature 10 and control spring compensating spool 11. Typical resistance values for such an arrangement are as follows: Armature resistance 10, 105 ohms, inductance .010 henrys; copper spool 11, 140 ohms, non-inductive; shunt 12, 6,000 ohms, non-inductive; resistance between taps 0 and 150, 3300 ohms; resistance between taps 0 and 300, 6,600 ohms. This scheme, while giving a universal temperature compensation, that is, one which is correct for either voltage tap, greatly increases the phase angle of the current in the armature coil with respect to the line voltage and the reason for this can be seen in the great difference in "time constants" of the two branches of the shunted combination. The armature branch has fairly low resistance and some inductance, while the shunt branch has a very high resistance and no inductance. The effectiveness of the inductance varies with the frequency and introduces a frequency error. If this circuit is the potential circuit of a wattmeter where, as is usual, the stationary element of the instrument is energized by the current, it will be evident that an error in the wattmeter reading will exist due to phase angle error of the potential circuit. The phase angle error will not be particularly noticeable when the power factor is high, but this error is very noticeable when the power factor is low. For example, on a 60 cycle circuit and a power factor of cos $\phi = .1$, the phase angle error of the combination represented in Fig. 3 is 0° 7' and produces an inductive error of 2% in the wattmeter reading. The magnitude of these errors is not of such concern as the difficulty and uncertainty of making corrections therefor, since it will be evident that the resultant error changes with changes in power factor, frequency and wave form.

We have substantially eliminated these errors, while maintaining the universal compensation, by the arrangement represented in Fig. 4. Here the resistance values given for Fig. 3 are the same except for shunt 13 which is now made equal to about 3300 ohms, and this shunt is connected to include a considerable portion of resistance R. Temperature compensation for the 150 volt connection is first partially effected by the copper spool 11 alone and then more perfectly with the application of the non-inductive shunt resistance 13 at some point 14 along the main resistor R. The point 14 is not at all critical. The universal compensation is effected as in Fig. 3, but in Fig. 4, the time constants of the two parallel circuits are low and are more nearly equal than in Fig. 3. The branch through the armature contains a very much higher ratio of resistance to inductance than before. Thus, in Fig. 3, the resistance of this branch was 245 ohms while in Fig. 4, it is for the example given, 1275 ohms, while the armature self inductance remains the same in both cases. Owing to this large resistance in the armature branch, the phase angle of this branch is not increased to any noticeable amount over that of the original series, compensating scheme shown in Fig. 2.

In Fig. 5 our improved compensating arrangement is diagrammatically represented applied to a wattmeter of the dynamo electric type where the stationary coil 15 is the current coil of the wattmeter and 16 the control spring. The other elements are readily identified by the reference characters used in Fig. 4.

In the instrument circuits above referred to, it is assumed that the temperature compensation is to correct a tendency of the instrument to read high with increase in temperature. The armature 10 and the resistor 11, have positive temperature coefficients of resistance and are preferably made from copper and the resistances R and 13 are made from a material having a low or negligible temperature coefficient of resistance such for example, as manganin.

Should the instrument read low with an increase in temperature, then the temperature coefficients of resistance of the branches should be interchanged to compensate. Thus, the temperature coefficient of resistance of coil 11 should be made low and that of resistance 13 high.

In accordance with the provisions of the patent statutes, we have described the principle of operation of our invention, together with the apparatus which we now consider to represent the best embodiment thereof; but we desire to have it understood that the apparatus shown and described is only illustrative and that the invention may be carried out and applied to other modifications.

What we claim as new and desire to secure by Letters Patent of the United States, is:—

1. In an alternating current electrical measuring instrument, a moving coil armature, a control spring for opposing the torque of the armature, a temperature compensating resistance connected in series with the armature, a permanently connected resistance element having several times the resistance of the above mentioned series circuit connected in series therewith, and a resistor shunting the armature, compensating resistance and a substantial portion of the high resistance element, the parallel branches thus formed having sufficiently low and similar time constants to prevent appreciable frequency errors.

2. In an alternating current electrical measuring instrument, a moving coil armature circuit arranged with at least two taps for different measurement ranges, a control spring for opposing the armature deflection, a control spring compensating resistance in series with the armature, a resistor shunting a portion of the armature circuit including the armature and the control spring compensating resistance, said shunt resistor being adjusted to cause the control spring compensation to be universal for both ranges, the parallel branches of the circuit thus formed having sufficiently low and similar time constants to prevent appreciable frequency and phase angle errors.

3. An alternating current wattmeter of the electrodynamic type having the moving coil armature in the potential circuit, said circuit having at least two voltage taps for multiple range measurements, a control spring compensating resistance in the potential circuit, a resistor shunting a portion of the potential circuit, including the armature coil and the control spring compensating resistance for making the control spring compensation universal for the two voltage taps, the parallel branches thus formed having sufficiently low and similar time constants to prevent appreciable phase angle errors on low power factor measurements.

In witness whereof, we have hereunto set our hands this 14th day of October, 1924.

ALMON J. CORSON.
STEPHEN C. HOARE.